April 9, 1946.  H. KLEMPERER  2,397,966
ELECTRICAL APPARATUS
Original Filed March 11, 1939  2 Sheets-Sheet 1

INVENTOR.
HANS KLEMPERER,
BY Elmer J. Gorn
ATTY.

April 9, 1946.   H. KLEMPERER   2,397,966
ELECTRICAL APPARATUS
Original Filed March 11, 1939   2 Sheets-Sheet 2
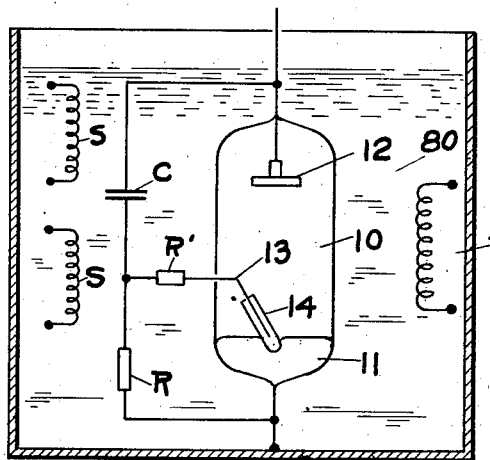
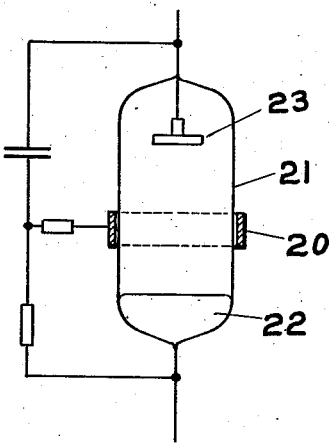
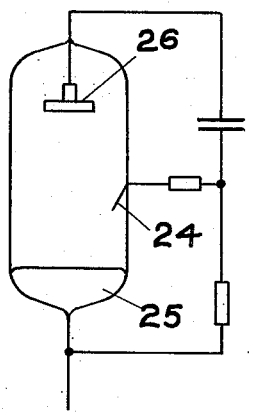
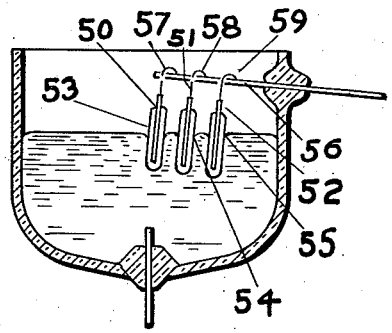
INVENTOR.
HANS KLEMPERER,
BY Elmer J. Gorn
ATTY.

Patented Apr. 9, 1946

2,397,966

UNITED STATES PATENT OFFICE 2,397,966

ELECTRICAL APPARATUS

Hans Klemperer, Belmont, Mass., assignor to Raytheon Manufacturing Company, Newton, Mass., a corporation of Delaware Original application March 11, 1939, Serial No. 261,399. Divided and this application November 4, 1941, Serial No. 417,798

9 Claims. (Cl. 315—234)

This is a division of applicant's copending application, Serial No. 261,399, filed March 11, 1939, which has become Patent No. 2,299,094, granted October 20, 1942.

The present invention relates to a high voltage rectifier or inverter device. Such devices may employ a transformer with several high voltage windings and a multiple of electronic gas-filled tubes of the single anode type, the tubes and transformer being assembled in an oil cooled transformer tank.

In high voltage systems the use of hot cathode tubes and ignitron tubes appears to be impractical because of the necessity of providing highly insulated heater transformers for maintaining the hot cathode or other igniter firing means. Moreover the limited life of these hot cathodes endanger the applicability of the whole scheme at least for power purposes. For these reasons power systems based on the use of rectifier tubes for the production of high voltage or using high voltage have had definite limitations.

In the present invention electronic gas-filled tubes are used with an auxiliary electrode for igniter purposes. Such ignition may be obtained by the use of dielectric means or with direct electronic control as will appear later. In particular, a glass igniter tube may be used in which the auxiliary conducting electrode is separated from the cathode by dielectric means, such as glass, quartz, or other suitable material. Such glass igniter tubes use relatively high voltages, around 1 kv., and an extremely small current (about $5 \times 10^{-6}$ amperes) for starting the discharge of the arc between the solid anode of the tube and the mercury pool cathode. Particularly no rectifier means are needed between the starter and the supply line.

The advantage of the system in the present invention is that no separate heating or firing means are necessary and no heating transformer is necessary, and as a result the difficulties of insulation are greatly overcome.

Besides this, the control is positive, and as will be noted from the description below may be designed for more efficient rectification or conversion, as the case may be.

The invention will be more clearly understood in connection with the drawings, in which:

Fig. 3 shows schematically a detail of the glass igniter tube and its connections in circuit;

Fig. 4 shows a modification of the drawings of Fig. 3;

Fig. 5 shows a still further modification of the device of Fig. 4;

Fig. 6 shows a further modification of the tube of Fig. 3; and

Fig. 7 shows a further detail modification.

Figure 1:
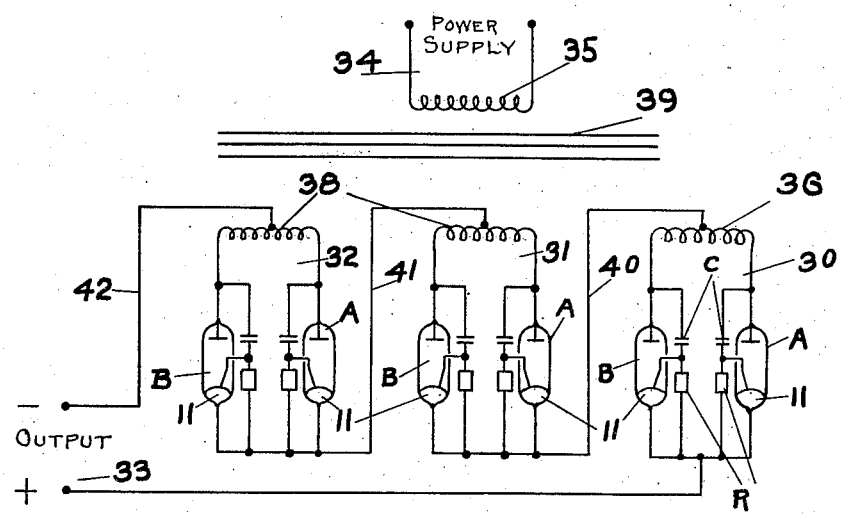
Fig. 1 shows the present system as applied to a rectifier alternating current and converting it to a high voltage direct current.
Figure 2:
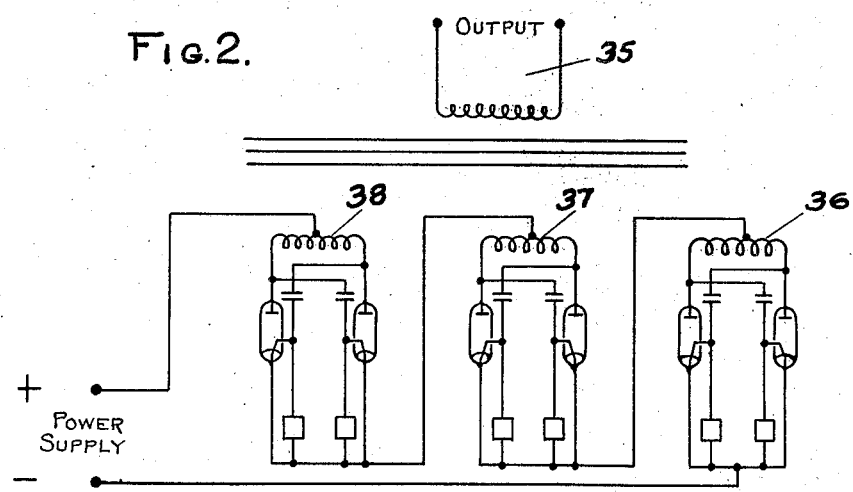
Fig. 2 shows a similar type circuit used inversely as an inverter.

Considering first the arrangement shown in Fig. 3 which may apply to each of the tubes described in Figs. 1 and 2, the tube 10 of Fig. 3 may be a gaseous tube with a cathode 11 of a mercury pool and an anode 12 of some usual conducting material. The tube is provided with an auxiliary electrode 13 which is surrounded at its ends by a shield or cover 14 of some dielectric material, such as glass, porcelain, fused quartz or insulating oxide.

The cathode and anode 11 and 12 respectively are connected together through a resistor R and a capacity C, the resistor R having a very high resistance and the capacity C having a very low capacitance. The electrode 13 is connected to the conductor joining the capacity and the resistor through a second resistance $R^1$ which may be chosen as desired, depending upon various desired effects. In fact the resistor $R^1$ may in cases be omitted, and the electrode 13 connected directly to a point between the condenser C and the resistor R.

The circuit just described serves a double purpose. First the capacity and the resistor serve to divide the potential difference between the main anode and the main cathode 12 and 11 respectively, and to limit the voltage between the starting electrode and the cathode to such a value necessary to start the discharge but not sufficient to cause a breakdown of the dielectric that surrounds the conducting starter core.

Secondly, by the use of a capacity and resistor, the phase of the starter voltage as against the anode voltage is advanced and brings about a firing of the tube at the beginning of the alternating current cycle. A convenient size for capacity and resistance in a 20 kv. anode voltage connection would be about $R=10^9$ ohms $C=2 \times 10^{-12}$ F. This combination would limit the starter voltage to 3 kv. and at the same time allow a starting current of about $10^{-5}$ amperes to flow, which values are within the operating range of the glass igniter tubes. The wave shape of the starter voltage should preferably be made non-sinusoidally by the application of non-linear capacities or resistors. Further, the starter voltage may be made peaked in one polarity and flat in the other polarity. In such an arrangement the starter voltage should be made peaked at the firing polarity and flat at the blocking polarity; that is to say, the starting voltage should be peaked at the instant that the tube is energized with the proper polarity to bring about a current flow as the discharge in the tube occurs.

Following this in cycle, the starting voltage should be flat during the time that the polarity of the tube is such that no current is to flow, for the purpose of making the changes of dielectric breakdown of the starter more remote. Non-linear resistances which change their ohmic resistance as a function of the applied potential are quite common, and substances such as "Thyrite" or a glow discharge tube may be used.

A glow discharge tube when used should preferably be made non-symmetrical in its discharge operation by using electrodes of different materials and different sizes so that the discharge is sustained more easily in one direction than in the opposite, with the glow voltage in starting polarity slightly above the firing potential and the glow voltage in blocking polarity as low as possible. Since only a very small current is to flow through the glow discharge tube, its life would be practically unlimited. For the choice of non-linear capacities, piezo electric crystals of the Rochelle salt type may be used. By this means it is possible to vary in a high voltage circuit the wave shape in the same manner as it is in a current-carrying circuit by the use of coils when wound on saturated iron cores.

In Fig. 3 it will be noted that the primary P and secondaries S,S of the transformers in Figs. 1 and 2 may be immersed in oil 80 in the tank 81 with the tube 10 and condenser C and resistances R and R¹, so that if the temperature of the oil becomes excessive, a condensive reactance C of the Rochelle salts crystal type, as explained later, may be used as a control element. In place of the use of a tube and circuit, described in Fig. 3, the modification in Fig. 4 may be used, in which the auxiliary electrode 20 is made in the form of a collar surrounding the tube 21 and dielectrically separated from the mercury pool 22 by means of the glass 21. Otherwise the tube corresponds similarly to that indicated in Fig. 3, with the electrode 23 serving as the anode and the same electrical connections for the auxiliary 20 as previously described in Fig. 3.

A further modification is shown in Fig. 5 in which an auxiliary electrode 24 is used spaced apart from the mercury pool 25. Due to the positioning of the auxiliary electrode 24 with respect to the mercury pool 25, an electric field strength of great intensity is set up between the auxiliary electrode 24 and the mercury pool 25, although the voltage drop between the electrode 24 and 25 may be less than that between the electrode 25 and the anode 26. The discharge from the pool 25 to the auxiliary electrode 24 controls the discharge of the tube.

In Figs. 1 and 2 are shown circuits for use respectively as rectifiers and inverters employing the gaseous tubes described in connection with Figs. 3, 4 and 5. The system indicated in Fig. 1 is for a full wave rectifier with three groups of tubes associated in the circuits, respectively, 30, 31 and 32, which are similar to each other. These circuits or networks are connected in series with each other and with the output 33 indicated at the left of the figure. In Fig. 1 power is supplied through the power transformer 34 which has a single primary 35 and three secondaries 36, 37 and 38, all of which may be wound on the same core with the primary 35, as indicated by the lines 39. Each winding 36, 37 and 38 is tapped at the center point and connected to the common conductor for the cathodes 11 of the following group as indicated by the conductors 40, 41, and the conductor 42 going to the negative side of the output. In each group 30, 31 and 32, first one tube A fires when the current flows in one direction in the transformers 36, 37 and 38, and the other tube B fires when the current reverses and flows in the other direction; that is to say, first the tubes labelled A operate, and then the tubes labelled B, operate, the current, however, being always in such a direction as to produce positive and negative potentials at the output as indicated in the figure.

Fig. 2 shows the same system as applied to the inverter. In this case direct current power is supplied and alternating current is produced at the output of the transformer 35 through the same control system as indicated in Fig. 1.

In Fig. 6 is shown a tube of the type shown in Fig. 3, except that several starting electrodes are used in this tube. It frequently happens in mercury pool tubes that the dielectric surrounding the conducting starter core breaks down electrically or that the mercury pool becomes dirty and "wets" the starter; that is to say, the meniscus of the mercury pool in the vicinity of the starter is changed by the presence of impurities in such a manner that the field strength at the surface of the mercury does not rise with the voltage applied to a value which will exceed the critical value of cold emission on which the formation of the cathode spot is based.

Electric breakdown or "shorting" of the starter insulation happens where the thickness of the insulation is preferably kept low in order to hold the starting voltage within bearable limits. In this case flaws occur quite commonly or at least develop along the insulator surface and bring about a breakdown in a relatively short time. If the starter has shorted, the whole tube is useless. While several starters with individual leads could be used, this design is expensive and would, in addition, mean an interruption of service while the new connection was being made.

In Fig. 6 there is shown a group of starter electrodes 50, 51 and 52, each respectively having its insulating dielectric 53, 54 and 55. Each electrode 50, 51 and 52 is joined to the same holder 56 of conductive material by means of resistance elements 57, 58 and 59, respectively. The supports 57, 58 and 59 are preferably made of nickel or any resistive alloy or material that stands mercury vapor and has a comparatively low melting point. The use of these elements is not only to provide a fusible connection in case of breakdown, but also to provide a potential drop which instantly leads the discharge to the holder 56 during regular operation, and thereby avoids current passing through the resistance.

The insulations 53, 54 and 55 may be extended up to the holder 56 to act as a support for each electrode and also as a shield against the discharge. This is shown in Fig. 7 where the holder 70 supports the starting electrode 71 through an insulated and shielded support 72. In this case the electrode 71 is connected to the holder 70 by means of the resistance elements 73 which are fusible in the same manner as described in connection with Fig. 6.

The ohmic resistance in line with the common starter lead 56 of the tube has such a resistance that it passes a current big enough to melt the connecting wires 57, 58 and 59 instantly when the respective starter insulation has failed. Such current should be, for instance, in this particular case, in the neighborhood of one milliampere. This current is regularly flowing to the exposed holder 56 during every cycle just after the arc has struck. This means a small loss which could be prevented by a complete enclosure of connecting wires and holder, if necessary.

In a common type of dielectric starter, which is the glass starter, about ten microamperes at around 500 volts are needed for each start. If the multiple arrangement consists of ten individual starters, ten times this current or $\frac{1}{10}$ milliampere will flow during each start. With 1000 volts at the starter circuit as a safe value, one megohm as a series resistor would be a sufficient limitation for regular operation and still would pass enough current to fuse the connecting wire in case of a starter short.

After melting of the connecting wire, the shorted starter falls on the mercury pool, and after some time would be carried away to the wall by surface tension effect. As an alternative the disconnected starter could be held in place by an insulating connection to the holder. This would also be done if holder and wires are shielded as mentioned above.

A bundle of ten starters draws ten times the (dielectric) current a single starter would draw. If all ten starters are arranged near each other, a slight heating effect at the mercury surface will become notable both during the forward and inverse half cycle. Such heating effect is an active agent to keep the mercury surface clean in the immediate neighborhood of the starter tips. This effect is observable with single starters, but only with the described starter bundle is it really effective. If such a bundle were applied without the above-described melting lead device, it would mean that at the first short of a single starter in the bundle, which is hard to inspect or to make entirely flawless, the whole tube would become inoperative.

As a non-linear capacity C, Fig. 3 may be crystals of the Rochelle salt type. The action of these crystals is such that with rising voltage (field strength), the dielectric constant of the crystal changes its value rather sharply. This phenomenon is the electrostatic analogy to the electromagnetic effect of iron saturation, where the magnetic permeability varies with magnetic field strength. Therefore, if the voltage across a Rochelle salt condenser varies in a sinusoidal manner, a peaked current will flow through it. In the circuit of this invention, an ohmic resistor R, Fig. 3, is in parallel to the starter and in series with the condenser. If the condenser is of the Rochelle salt type, a peaked charging current will flow through it while its voltage varies sinusoidally. This peaked current causes a peaked voltage drop across the resistor R and across the starter, thus making starting conditions more accurate.

Besides the above, the thermal effect in these crystals may be used as a protective means. When a certain temperature is reached, which depends on the composition of the crystal, the dielectric constant drops sharply. In the circuit as described, this means that when a certain temperature is reached, the starter voltage decreases sharply, and likewise if the transformer oil gets too hot, the tube stops firing. This effect thus provides a protection device.

What is claimed is:

1. In combination, a rectifier circuit having a plurality of electrical space discharge tubes each comprising a cathode, an anode and a firing electrode, a transformer secondary having its terminals connected to said anodes, and a common connection interconnecting said cathodes, and means connecting the cathode and anode of each tube through a capacity and a resistance, and means connecting the firing electrode of said tube to a point between said capacity and said resistance for supplying a potential to said firing electrode for starting the discharge, said capacities having a dielectric which shows saturation effects at the operating voltages impressed thereon.

2. In combination, a rectifier circuit having a plurality of electrical space discharge tubes each comprising a cathode, an anode and a firing electrode, each of which is of the type which initiates an arc spot on a cathode when supplied with an igniting impulse, a transformer secondary having its terminals connected to said anodes, and a common connection interconnecting said cathode, and means connecting the cathode and anode of each tube directly through a capacity and a resistance, and means connecting the firing electrode of said tube to a point between said capacity and said resistance for supplying a potential to said firing electrode for starting the discharge, said resistance being of a non-linear type.

3. In combination, a rectifier circuit having a plurality of electrical space discharge tubes each comprising a cathode, an anode and a firing electrode, a transformer secondary having its terminals connected to said anodes, all said elements being immersed in the same cooling medium, and a common connection interconnecting said cathodes, and means connecting the cathode and anode of each tube through a capacity and resistance, and means connecting the firing electrode of said tube to a point between said capacity and said resistance for supplying a potential to said firing electrode for starting the discharge, said capacities having a dielectric which shows saturation effect, and which reduces in capacity upon increasing temperature in such a manner that when the critical temperature is reached, insufficient current is passed to energize the tube.

4. In combination, an electrical space discharge tube comprising a pair of electrodes between which a discharge is adapted to take place, and a control electrode therefor, a network comprising a capacity and an impedance, said capacity comprising a dielectric which exhibits saturation effects at the operating voltages impressed thereon, means for impressing a periodic voltage on said network, and means for supplying a voltage appearing between spaced points in said network to said control electrode.

5. In combination, an electrical space discharge tube comprising a cathode, an anode, and a firing electrode for initiating a discharge between said cathode and anode, a capacity and an impedance connected between said cathode and anode, said capacity comprising a dielectric which exhibits saturation effects at the operating voltages impressed thereon, said firing electrode being connected to a point between said capacity and said resistance.

6. In combination, an electrical space discharge tube comprising a pair of electrodes between which a discharge is adapted to take place, and a control electrode therefor of the type which initiates an arc spot on the cathode when supplied with an igniting impulse, a network comprising a non-linear resistance and a reactive impedance, means for impressing a periodic voltage on said network, and means for supplying a voltage appearing between spaced points in said network to said control electrode.

7. In combination, an electrical space discharge tube comprising a cathode, an anode, and a firing electrode of the type which is in contact with the cathode and initiates an arc spot on the cathode when supplied with an igniting impulse for initiating a discharge between said cathode and anode, a capacity and an impedance connected directly between said cathode and anode, said impedance being of a non-linear type, said firing electrode being connected to a point between said capacity and said resistance.

8. An electrical space discharge tube comprising an anode, a cathode, and a firing electrode, and means for applying a firing voltage to said firing electrode comprising a source of alternating current connected to a circuit, including an impedance and an unsymmetrically-conducting glow discharge tube connected in series with said source of alternating current, and means for deriving said firing voltage from spaced points on said circuit and connecting said voltage to said firing electrode.

9. In combination, a system including an electrical space discharge tube comprising a pair of electrodes between which a discharge is adapted to take place, and a control electrode therefor, a network comprising a capacity and an impedance, said capacity comprising a dielectric which exhibits saturation effects below a predetermined temperature, means for impressing a periodic voltage on said network, means for supplying a voltage appearing between spaced points in said network to said control electrode, and a cooling medium for elements of said system, said cooling medium being thermally associated with said dielectric, whereby said saturation effects are substantially decreased and initiation of conduction in said tube is inhibited upon the rise of the temperature of said cooling medium above a predetermined value.

HANS KLEMPERER.